US012750754B2

(12) United States Patent
Watfa

(10) Patent No.: US 12,750,754 B2
(45) Date of Patent: Sep. 29, 2026

(54) METHOD AND APPARATUS FOR IMPROVING CELLULAR INTERNET OF THINGS (CIOT) OPTIMIZATIONS IN A TELECOMMUNICATION NETWORK

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 17/999,539

(22) PCT Filed: May 21, 2021

(86) PCT No.: PCT/KR2021/006312
§ 371 (c)(1),
(2) Date: Nov. 21, 2022

(87) PCT Pub. No.: WO2021/235878
PCT Pub. Date: Nov. 25, 2021

(65) Prior Publication Data

US 2023/0199605 A1 Jun. 22, 2023

(30) Foreign Application Priority Data

May 22, 2020 (GB) .................................. 2007704.6
May 18, 2021 (GB) .................................. 2107088.3

(51) Int. Cl.
*H04W 36/32* (2009.01)
*H04W 36/00* (2009.01)

(52) U.S. Cl.
CPC ....... *H04W 36/32* (2013.01); *H04W 36/0022* (2013.01); *H04W 36/0079* (2018.08)

(58) Field of Classification Search
None
See application file for complete search history.

(56) References Cited

U.S. PATENT DOCUMENTS 10,674,469 B2 6/2020 Kim et al.
10,708,824 B2 7/2020 Lee et al.
(Continued)

FOREIGN PATENT DOCUMENTS

CN 110393038 A 10/2019
CN 110612742 A 12/2019
(Continued)

OTHER PUBLICATIONS

3GPP TSG-CT WG1 Meeting #123-e, Electronic meeting, Apr. 16-24, 2020 , (Year: 2020).*
(Continued)

*Primary Examiner* — Charles C Jiang

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of redirecting a User Equipment, UE, from a serving network to a target network, whereby the serving network rejects a service request message.

15 Claims, 8 Drawing Sheets

(56) References Cited

U.S. PATENT DOCUMENTS

| | | | | |
|---|---|---|---|---|
| 10,863,390 | B2 | 12/2020 | Huang-Fu et al. | |
| 10,869,234 | B2 | 12/2020 | Velev et al. | |
| 10,924,912 | B2 | 2/2021 | Kim et al. | |
| 11,259,242 | B2 | 2/2022 | Kawasaki et al. | |
| 11,259,345 | B2 | 2/2022 | Kawasaki et al. | |
| 11,425,595 | B2 | 8/2022 | Jin et al. | |
| 2019/0116631 | A1 | 4/2019 | Talebi Fard et al. | |
| 2019/0159157 | A1 | 5/2019 | Gupta | |
| 2020/0015311 | A1 | 1/2020 | Kim | |
| 2024/0023048 | A1* | 1/2024 | Wang | H04W 60/04 |

FOREIGN PATENT DOCUMENTS

| | | | | |
|---|---|---|---|---|
| CN | 110663284 | A | 1/2020 | |
| CN | 110720234 | A | 1/2020 | |
| CN | 113709829 | A * | 11/2021 | H04W 36/00224 |
| EP | 3644685 | A1 | 4/2020 | |
| WO | 2018128505 | A1 | 7/2018 | |
| WO | 2019097302 | A1 | 5/2019 | |
| WO | 2019139091 | A1 | 7/2019 | |
| WO | 2019139141 | A1 | 7/2019 | |
| WO | 2019198721 | A1 | 10/2019 | |
| WO | 2020013469 | A1 | 1/2020 | |
| WO | 2020/032767 | A1 | 2/2020 | |
| WO | 2020036802 | A1 | 2/2020 | |
| WO | 2020201624 | A1 | 10/2020 | |
| WO | 2022151413 | A1 | 7/2022 | |

OTHER PUBLICATIONS

Supplementary European Search Report dated Sep. 15, 2023, in connection with European Patent Application No. 21808367.3, 11 pages.

International Search Report and Written Opinion of the International Searching Authority dated Oct. 8, 2021, in connection with International Application No. PCT/KR2021/006312, 9 pages.

Combined Search and Examination Report dated Mar. 10, 2022, in connection with United Kingdom Application No. GB2107088.3, 6 pages.

Huawei et al., "Service reject for emergency EPS fallback," C1-202805, 3GPP TSG-CT WG1 Meeting #123-e, Electronic meeting, Apr. 16-24, 2020, 10 pages.

Qualcomm Incorporated, "Correct UE behavior for receiving 5GMM cause #31 in 5GS," C1-202676 (was C1-202271), 3GPP TSG-CT WG1 Meeting #123-e, Electronic meeting, Apr. 16-24, 2020, 22 pages.

Qualcomm Incorporated, "Correct handling of receiving EMM cause #31 in EPS," C1-202674 (was C1-202270), 3GPP TSG-CT WG1 Meeting #123-e, Electronic meeting, Apr. 16-24, 2020, 30 pages.

Samsung, "Redirection of UE from N1 mode to S1 mode," C1-203666, 3GPP TSG-CT WG1 Meeting #124-e, Electronic meeting, Jun. 2-10, 2020, 20 pages.

3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020, 430 pages.

3GPP TS 23.502 V16.4.0 (Mar. 2020), Technical Specification, 3rd Generation Partnership Project; Technical Specification Group Services and System Aspects; Procedures for the 5G System (5GS); Stage 2 (Release 16), Mar. 2020, 583 pages.

3GPP TS 24.301 V16.4.0 (Mar. 2020), Technical Specification, 3rd Generation Partnership Project; Technical Specification Group Core Network and Terminals; Non-Access-Stratum (NAS) protocol for Evolved Packet System (EPS); Stage 3 (Release 16), Mar. 2020, 573 pages.

3GPP TS 24.501 V16.4.1 (Mar. 2020), Technical Specification, 3rd Generation Partnership Project; Technical Specification Group Core Network and Terminals; Non-Access-Stratum (NAS) protocol for 5G System (5GS); Stage 3; (Release 16), Mar. 2020, 666 pages.

Examination Report dated Nov. 25, 2022, in connection with United Kingdom Application No. GB2107088.3, 4 pages.

Office Action dated May 16, 2025, in connection with Chinese Application No. 202180037272.7, 19 pages.

Combined Search and Examination Report issued Oct. 30, 2023, in connection with United Kingdom Patent Application No. GB2313949.6, 6 pages.

Combined Search and Examination Report issued Nov. 1, 2023, in connection with United Kingdom Patent Application No. GB2313947.0, 4 pages.

Search Report issued Jun. 27, 2024, in connection with United Kingdom Patent Application No. GB2408055.8, 3 pages.

3GPP TS 23.401 V15.2.0 (Dec. 2017) Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 15), Dec. 2017, 404 pages.

Office Action dated Oct. 23, 2025, in connection with Chinese Application No. 202180037272.7, 11 pages.

Search Report dated Oct. 25, 2023, in connection with GB Application No. GB2313948.8, 3 pages.

Notification of the Decision to Grant a Patent Right for Patent for Invention dated Mar. 5, 2026, in connection with Chinese Application No. 202180037272.7, 7 pages.

* cited by examiner

FIG. 2

| 8 | 7 | 6 | 5 | 4 | 3 | 2 | 1 | |
|---|---|---|---|---|---|---|---|---|
| 5GMM capability IEI | | | | | | | | Octet 1 |
| Length of 5GMM capability contents | | | | | | | | Octet 2 |
| SGC | 5G-HC-CP CIoT | N3 data | 5G-CP CIoT | RestrictEC | LPP | HO attach | S1 mode | Octet 3 |
| RACS | NSSAA | 5G-LCS | V2XCNPC5 | V2XCEPC5 | V2X | 5G-UP CIoT | 5GS RVCC | Octet 4* |
| 0 | 0 | 0 | 0 | 0 | MultipleDRB | WUSA | CAG | Octet 5* |
| 0 | 0 | 0 | 0 | 0 | 0 | 0 | 0 | Octet 6*-15* |
| Spare | | | | | | | | |

METHOD AND APPARATUS FOR IMPROVING CELLULAR INTERNET OF THINGS (CIOT) OPTIMIZATIONS IN A TELECOMMUNICATION NETWORK

CROSS-REFERENCE TO RELATED APPLICATIONS

This application is a 371 National Stage of International Application No. PCT/KR2021/006312, filed May 21, 2021, which claims priority to United Kingdom Patent Application No. 2007704.6, filed May 22, 2020, and United Kingdom Patent Application No. 2107088.3, filed May 18, 2021, the disclosures of which are herein incorporated by reference in their entirety.

BACKGROUND

1. Field

The present invention relates to Cellular Internet of Things (CIoT) networks and improvements which may be made to one or more optimizations associated therewith.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An aspect of the present invention provides a method and apparatus for improving cellular internet of things (CIoT) optimizations in a telecommunication network a method and apparatus for supporting UE access control.

Embodiments of the present invention provide a method and apparatus for improving cellular internet of things (CIoT) optimizations in a telecommunication network a method and apparatus for supporting UE access control.

In order to achieve the above objective, the technical solution of the present disclosure is as follows.

In one embodiment, a method performed by a user equipment (UE) for redirecting the UE from a serving network to a target network, the method comprising: in case that the UE is in a N1 mode, receiving a service reject with fifth generation mobility management (5GMM) cause #31; setting a fifth generation system (5GS) update status to 5U3 ROAMING NOT ALLOWED; resetting the service request attempt counter and enter the state 5GMM-REGISTERED LIMITED-SERVICE; operating in a single-registration mode; handling an evolved packet system (EPS) parameters, an EPS mobility management (EMM) parameters, EMM state, and EPS update status; and discarding the service reject message with cause #31, if the message is received without integrity protection, wherein the UE enable evolved universal terrestrial radio access (E-UTRA) capability if it was disabled and disables the N1 mode capability for 3rd generation partnership project (3GPP) access, wherein, If 5GMM cause #31 is received by the UE that has not indicated support for cellular internet of things (CIoT) optimizations, or received by the UE over non-3GPP access, or from a cell belonging to an stand-alone non-public network (SNPN), this is considered as an abnormal case, wherein the serving network rejects a service request message, and wherein the serving network is a fifth generation core (5GC) and the target network is an evolved packet core (EPC) whereby an access and mobility management (AMF) of the serving network sends a Service Reject message and includes 5GMM cause #31 "Redirection to EPC required".

In another embodiment, a method performed by a user equipment (UE) for managing a packet data network (PDN) connection, the method comprising: in case that the PDN connection is established in S1 mode, verifying if an associated PDU session is associated with a control plane only indication; operating in single-registration mode in a network supporting N26 interface, wherein the PDN connection is established after a first inter-system change from S1 mode to N1 mode; and supporting more than 16 packet filters for the PDU, wherein the PDU session is one of "IPv4", "IPv6", "IPv4v6", or "Ethernet" PDU session type.

In another embodiment, a method performed by a user equipment (UE) for managing a PDN connection in the UE, the method comprising: determining that a PDU session modification procedure should performed for the purpose of indicating that the UE supports reflective quality of service (RQoS), wherein after a system change from S1 mode to NB-N1 mode, if the UE determines that a PDU session modification procedure should performed for the purpose of indicating that the UE supports RQoS, the UE nevertheless, does not send PDU SESSION MODIFICATION REQUEST message.

In another embodiment, a method performed by a user equipment (UE) for operating the UE in NB-N1 mode, the method comprising: informing a serving network about a number of data radio bearers (DRBs), that the UE is able to support, according to its capabilities.

In another embodiment, a method performed by a user equipment (UE) for requesting establishment of user plane resources for a number of protocol data unit (PDU) sessions, the method comprising: requesting the establishment of user plane resources for a number for PDU sessions, wherein the number of PDU sessions is not greater than a maximum number of data radio bearers (DRBs) that the UE can support, and wherein when the UE requests user plane resources, the UE, by means of an uplink data status information element (IE) does not indicate a total number of user plane resources that is greater than a number of DRBs that the UE can support.

In another embodiment, a method performed by a network for establishing user plane resources in response to a request from a user equipment (UE), the method comprising: establishing the user plane resources in response to the request form the UE wherein the user plane resources are established if the total number of User Plane resources does not exceed a maximum number of data radio bearers (DRBs) that are supported by the UE, wherein an access and mobility management (AMF) in the network requests an SMF in the network to establish the user plane resources, and wherein the AMF verifies if a new DRB can be established based on how many DRBs the UE can support.

In another embodiment, a method performed by a network for controlling establishing user plane resources for a user equipment (UE), the method comprising: establishing the user plane resources for the UE, wherein if a payload container type information element (IE) is set to "N1 SM information", the request type IE is set to "initial request", an access and mobility management (AMF) in the network verifies how many data radio bearers (DRBs) are already present for the UE and if the AMF determines that there are user plane resources that are equal to a maximum number of the DRBs that the UE supports, then the AMF either: (a) sends a message back to the UE; or (b) establishes the session as a control plane only session.

Accordingly present invention, a method and apparatus for improving cellular internet of things (CIoT) optimizations in a telecommunication network a method and apparatus for supporting UE access control is provided.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 2 shows a message format according to an embodiment of the invention.

DETAILED DESCRIPTION

Figure 1:
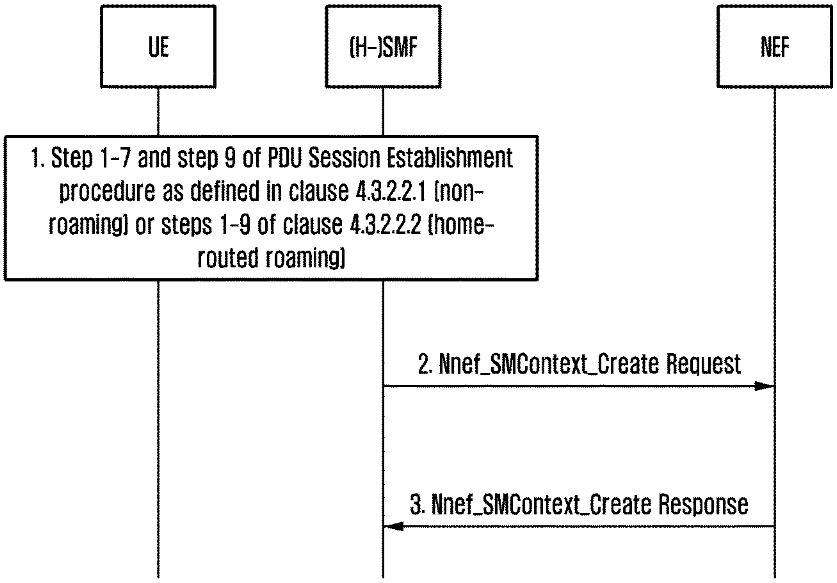
FIG. 1 Prior Art
FIG. 1 shows signaling according to the prior art.

There are primarily two main types of CIoT optimizations referred to as: user plane (UP) CIoT optimization and control plane (CP) CIoT optimization.

UP CIoT optimization refers to optimizations that relate to the use of the user plane resources. Whereas CP CIoT optimization refers to optimizations that relate to the efficient transfer of data over the control plane. Note that "data" may also refer to SMS and location service messages.

The Network Access Stratum (NAS) specification TS 24.501 (for N1 mode) provides a description of these optimizations and specifically includes sections that specify the User Equipment (UE) and network behaviour when CP CIoT optimization is used. For example, sections 5.6.1.2.2 and 5.6.1.4.2 are particular to the case when CP CIoT optimization is used.

One of the main aspects of CP CIoT optimization is that the UE can send data from idle mode using the Control Plane Service Request (CPSR) message that has been defined in the aforementioned NAS specification.

Usually, the UE uses one of UP and CP optimizations at a time although it is possible that both get used simultaneously as will be explained shortly. When the UE uses CP CIoT optimization, the UE's PDU sessions are used to transfer data over the control plane i.e. over NAS signaling messages. However, a Protocol Data Unit (PDU) session that is used for CP CIoT optimization can be a control plane only session, if the PDU Session Establishment Accept message includes the Control plane only indication information element (IE), as referenced in the aforementioned NAS specification, or the session can be used for CP CIoT optimization and can be switched to a user plane session. Note that the latter is not a permanent switch to a user plane session but rather the UE can request the establishment of the user plane resources and use these resources for the transfer of data over the user plane. The UE may request the switch of the session to user plane based on e.g. the volume of data that needs to be sent or based on other conditions that are not specified. However, it is important to note that a PDU session for CP CIoT optimization may be a session for control plane data only, or may allow the UE to request the establishment of user plane resources for the transfer of data over the user plane while still considering that the session is for CP CIoT optimization.

When a PDU session gets switched to user plane (i.e. when the user plane resources gets established for such a PDU session), if the UE also supports UP CIoT optimization, then the UE can apply UP CIoT optimization to this session for which user plane has been established. Note that after the release of the user plane resources, the UE continues to use the session as one for CP CIoT optimization unless the UE requests the establishment of user plane resources again. Note that although the user plane resources may be established for a PDU session for CP CIoT optimization, the UE maintains the use of the CPSR message when it needs to initiate the service request procedure for the corresponding PDU session.

For control plane CIoT 5G system (5GS) optimization, a PDU session that is established to be using control plane only i.e. such session will never be switched to user-plane, will be anchored in the Network Exposure Function (NEF). Such PDU session has a PDU Session type of “Unstructured”. The overall procedure to establish a PDU session that is anchored in the NEF is shown below from section 4.25.2 of TS 23.502, which states, with reference to FIG. 1, comprising steps 1-3, known from the prior art:

“When the UE performs the PDU Session establishment with PDU Session type of “Unstructured”, and the subscription information corresponding to the UE requested Data Network Name (DNN) includes the “NEF Identity for NIDD” (NEF ID), then the Session Management Functions (SMF) initiates a SMF-NEF Connection establishment procedure towards the NEF corresponding to the “NEF ID” for that DNN/S-NSSAI Combination.

Step 1:

Steps 1-7 and step 9 of clause 4.3.2.2.1 for UE-requested PDU Session Establishment Procedure for non-roaming scenarios or steps 1-9 of clause 4.3.2.2.2 for UE-requested PDU Session Establishment Procedure for home-routed roaming scenarios. The (H-)SMF receives the Session Management Subscription data for the corresponding SUPI, DNN and S-NSSAI that is associated with NEF Identity for NIDD and NIDD information such GPSI and AF ID.

Step 2:

If the subscription information corresponding to DNN and S-NSSAI includes the “NEF Identity for NIDD” (NEF ID), the SMF shall create a PDU session towards the NEF. The SMF invokes Nnef_SMContext_Create Request (User Identity, PDU session ID, SMF ID, NIDD information, S-NSSAI, DNN) message towards the NEF. The UE capability to support Reliable Data Service (RDS) is included in the PCO in the PDU Session Establishment Request message.

If no AF has previously performed the NIDD Configuration procedure with the NEF for the User Identity received in step 2, then the NEF initiates the NIDD Configuration procedure (see clause 4.25.3) before step 3.

Step 3:

The NEF creates an NEF PDU session Context and associates it with User Identity and PDU session ID. The NEF invokes Nnef_SMContext_Create Response (User Identity, PDU session ID, S-NSSAI, DNN) towards the SMF confirming establishment of the PDU session to the NEF for the UE. If NEF supports and allows use of RDS, it indicate that to SMF and the SMF includes it in the PCO. If NEF supports Extended Buffering, NEF includes Extended Buffering Support indication in the response and subscribes for mobility-related events with the Access and Mobility Management (AMF) to receive an indication when the UE becomes reachable.”

Other PDU sessions, although used for control plane CIoT 5GS optimization, the AMF may decide to have such a session anchored at the UPF (also referred to as N6 PDU session) as described in the aforementioned NAS specification, which reads:

“If the UE and the network support both the control plane CIoT 5GS optimization and N3 data transfer, then when receiving the UE’s request for a PDU session establishment, the AMF decides whether the PDU session should be NEF PDU session or N6 PDU session as specified in 3rd generation partnership project (3GPP) TS 23.501 and then:

a) if NEF PDU session is to be established for unstructured data type, the AMF includes Control plane only indication for the requested PDU session to the SMF;
b) if N6 PDU session is to be established and the DNN or S-NSSAI of the newly requested N6 PDU session supports interworking with EPS as specified in TS 23.502:
    1) if there are existing N6 PDU sessions supporting interworking with EPS for this UE that were established with the Control plane only indication, the AMF includes the Control plane only indication for the newly requested N6 PDU session to the SMF; or
    2) if there are existing N6 PDU sessions supporting interworking with EPS for this UE that were established without the Control plane only indication, the AMF does not include the Control plane only indication for the newly requested N6 PDU session to the SMF;
    3) if there is no existing N6 PDU session supporting interworking with EPS for this UE, the AMF determines whether to include the Control plane only indication for the newly requested N6 PDU session to the SMF based on local policies, the UE’s preferred CIoT network behaviour and the supported CIoT network behaviour; and
c) if N6 PDU session is to be established and the DNN or S-NSSAI of the N6 PDU session does not support interworking with EPS as specified in TS 23.502, the AMF determines whether to include the Control plane only indication for the newly requested N6 PDU session to the SMF based on local policies, the UE’s preferred CIoT network behaviour and the supported CIoT network behaviour.”

CIoT 5GS optimizations (i.e. control plane CIoT 5GS optimization and user plane CIoT 5GS optimization) are not supported over non-3GPP access.

NB-IoT devices are restricted by the number of data radio bearers (DRBs) that they can support where the maximum is 2 DRBs at a time. In Fifth Generation Systems (5GS), unlike Evolved Packet System (EPS), the UE can have selective user-plane activation of any of its PDU sessions that it has established. For example, if the UE has established 3 PDU sessions, it does not necessarily mean that the UE will have DRBs for all 3 PDU sessions. Based on the need to send data over a particular PDU session, the UE can request the establishment of UP resources for 1 of its PDU sessions only. Note that UP resources constitute DRBs and other resources e.g. between the Radio Access Network (RAN) and the Core Network (CN) nodes such as the UPF (User Plane Function). Hence, UP resources are not necessarily limited to DRBs but can be used to refer to DRBs.

To select the establishment of UP resources for a specific PDU session, the UE uses the Uplink data status Information Element (IE) to indicate for which PDU session ID the resources are being requested for. The IE can be sent in the Control Plane Service Request (CPSR) message, Service Request (SR) message, or Registration Request message. The inclusion of the Uplink data status IE in the Registration Request message is based on specific conditions that are defined in the aforementioned NAS specification. However in general, the CPSR or SR message is used for the purpose of requesting the establishment of UP resources for at least one PDU session.

In NB-IoT, there can be UP resources established for at most 2 PDU sessions at a given time since the UE is limited by the number of DRBs that it can support in this mode.

Due to the restrictions described above, the aforementioned NAS specification has defined certain restrictions on the UE that is using user-plane CIoT 5GS optimization. For example, the following restriction is introduced for the service request procedure:

"In NB-N1 mode, this procedure shall not be used to request the establishment of user-plane resources:

a) for more than two PDU sessions if there is currently:
   1) no user-plane resources established for the UE;
   2) user-plane resources established for one PDU session; or
b) for additional PDU sessions, if the UE already has user-plane resources established for two PDU sessions."

The following restriction (see bullet c, below) is introduced for the PDU session establishment procedure:

"The UE shall not request a PDU session establishment:

a) for a Local Area Data Network (LADN) when the UE is located outside the LADN service area;
b) to transfer a PDU session from non-3GPP access to 3GPP access when the 3GPP PS data off UE status is "activated" and the UE is not using the PDU session to send uplink IP packets for any of the 3GPP PS data off exempt services (see subclause 6.2.10); or
c) when the UE is in NB-N1 mode, the UE has indicated preference for user plane CIoT 5GS optimization, the network has accepted the use of user plane CIoT 5GS optimization for the UE, and the UE currently has user-plane resources established for two other PDU sessions."

Although these restrictions are put in place for the UE, the network still performs a check to ensure that the restrictions are not ignored or erroneously disregarded. For example, during the PDU session establishment procedure, the AMF verifies if the UE already has UP resources established for at most 2 PDU sessions. If this is the case, then any new request to establish a PDU session from the UE will either be established as a PDU session for control plane CIoT optimization, or it will be rejected by the AMF. This is described below from the aforementioned NAS specification:

"Upon reception of a UL NAS TRANSPORT message, if the Payload container type IE is set to "N1 SM information", the Request type IE is set to "initial request", and a) the UE is in NB-N1 mode;
b) the UE has indicated preference for user plane CIoT 5GS optimization;
c) the network accepted the use of user plane CIoT 5GS optimization; and
d) the AMF determines that there are user-plane resources established for two other PDU sessions for this UE (see 3GPP TS 23.501);

the AMF shall either:

a) send back to the UE the message which was not forwarded as specified in subclause 5.4.5.3.1 case h1); or
b) proceed with the PDU session establishment and include the Control Plane CIoT 5GS Optimisation indication or Control Plane Only indicator to the SMF."

It should be noted again that these restrictions are only for NB-IoT devices i.e. UEs in NB-N1 mode in the case of 5GC.

Similar limitations exist for a UE in NB-IoT that is using CIoT optimizations in Evolved Packet System (EPS) i.e. a UE in NB-S1 mode. The main difference however, between Evolved Packet Core (EPC) and 5GC, is that EPC does not support selective user plane activation for a UE in connected mode (EPS mobility management (EMM)-CONNECTED mode). As such, while in S1 mode, if the UE is in connected mode for the purpose of data then the DRBs and UP resources will be set up for all Packet Data Network (PDN) connections that are active in the UE.

So for example, if the UE has established 3 PDN connections in EPS, when the UE sends the Service Request message, the mobility management entity (MME) will establish the UP resources for all 3 PDN connections.

However, for NB-IoT devices there is a limitation regarding the maximum number of DRBs that can be supported in S1 mode. The UE can support 1 or 2 DRBs, where 2 is the maximum number of DRBs that can be supported as described in 3GPP TS 24.301 V16.4.0:

"For a UE in NB-S1 mode, the UE's implementation-specific maximum number of active user plane radio bearers is 2 (as defined in 3GPP TS 36.300) when the UE sets the Multiple DRB support bit to "Multiple DRB supported" during attach or tracking area update procedures, and 1 otherwise."

The UE in S1 mode indicates in the UE network capability IE whether it supports 2 DRBs by setting the "Multiple DRB support" bit to "Multiple DRB supported".

It should also be noted that for NB-S1 mode, the support of DRB is limited to default EPS bearers and dedicated EPS bearers are not supported on NB-S1 mode. This is similar to 5GS in this regard. The following is specified in 3GPP TS 24.301 V16.4.0 regarding this:

"In NB-S1 mode, the dedicated EPS bearer contexts activation procedure is not used. Upon an inter-system mobility from WB-S1 mode to NB-S1 mode in EMM-IDLE mode, if the UE has at least one dedicated EPS bearer context in ESM state BEARER CONTEXT ACTIVE, the UE shall locally deactivate any such dedicated EPS bearer context and shall include the EPS bearer context status IE in TRACKING AREA UPDATE REQUEST message."

When the UE moves to NB-S1 mode, from WB-S1 mode, the UE will deactivate any dedicated EPS bearer and include the EPS bearer context status IE in TRACKING AREA UPDATE REQUEST message as specified in 3GPP TS 24.301 V16.4.0:

"The UE shall include the EPS bearer context status IE in TRACKING AREA UPDATE REQUEST message:

for the case g;
for the case s;
for the case zb;
if the UE has established PDN connection(s) of "non IP" or Ethernet PDN type; and
if the UE locally deactivated at least one dedicated EPS bearer context upon an inter-system mobility from WB-S1 mode to NB-S1 mode in EMM-IDLE mode."

It should be noted that the EPS bearer context status IE indicates which EPS bearer identity is active in the UE and the IE contains a bitmap each bit of which corresponds to a well-known EPS bearer identity (see section 9.9.2.1 of 3GPP TS 24.301 V16.4.0).

A UE that supports both S1 mode and N1 mode can be redirected by a core network (CN) e.g. 5G CN with which the UE is registering, to a target CN e.g. EPC, or vice versa. The following describes the overall concept as specified in the aforementioned NAS specification:

"The network that supports CIoT optimizations can redirect a UE between EPC and 5G Core Network (5GCN) as specified in subclause 5.31.3 of 3GPP TS 23.501. The network can take into account the UE's N1 mode capability or S1 mode capability, the CIoT network behaviour supported and preferred by the UE or the CIoT network behaviour supported by the network to determine the redirection.

NOTE: It is assumed that the network would avoid redirecting the UE back and forth between EPC and 5GCN.

The network redirects the UE to EPC by rejecting the registration request with the 5G Mobility Management (5GMM) cause #31 "Redirection to EPC required" as specified in subclause 5.5.1.2.5 and 5.5.1.3.5.

Upon receipt of reject message, the UE disables the N1 mode capability for 3GPP access as specified in subclause 4.9.2 and enables the Evolved Universal Terrestrial Radio Access (E-UTRA) capability if it was disabled in order to move to EPC.

The network that supports CIoT optimizations can also redirect a UE from EPC to 5GCN as specified in subclause 5.3.19.2 of 3GPP TS 24.301."

Currently, in 5GS, the AMF can redirect the UE to EPC by rejecting a Registration Request and including the 5GMM cause value #31.

Currently, in EPS, the MME redirect the UE to 5GC by rejecting the Attach Request, Tracking Area Update (TAU) Request, or the Combined TAU Request message, and including the EMM cause value #31 "Redirection to 5GCN required" (see 3GPP TS 24.301 V16.4.0).

Note that redirection of the UE is described in [4] which uses the term "steering" instead of redirection. The following is described in 3GPP TS 23.501 V16.4.0:

"The UE selects the core network type (EPC or 5GC) based on the broadcast indications for both EPC and 5GC, and the UE's EPC and 5GC Preferred Network Behaviour. Networks that support NB-IoT shall broadcast an indication whether N3 data transfer is supported or not in system information.

When the UE performs the registration procedure it includes its Preferred Network Behaviour (for 5G and EPC) in the Registration Request message and the AMF replies with the 5G Supported Network Behaviour in the Registration Accept message.

If the UE supports any of the CIoT 5GS Optimisations included in 5GC Preferred Network Behaviour, then when the UE performs an Attach or TAU procedure and the UE includes its EPC Preferred Network Behaviour then the UE shall also include its 5GC Preferred Network Behaviour.

In networks that support CIoT features in both EPC and 5GC, the operator may steer UEs from a specific CN type due to operator policy, e.g., due to roaming agreements, Preferred and Supported Network Behaviour, load redistribution, etc. Operator policies in EPC and 5GC are assumed to avoid steering UEs back and forth between EPC and 5GC.

To redirect a UE from 5GC to EPC, when the UE sends a Registration Request, the AMF sends a Registration Reject with an EMM cause value indicating that the UE should not use 5GC. The UE disables N1 mode and re-enables S1 mode, if it was disabled. The UE then performs either an Attach or TAU in EPC as described in clause 5.17.2.

To redirect a UE from EPC to 5GC, when the UE requests an Attach or TAU procedure, the MME sends a reject message with an EMM cause indicating the UE should not use EPC. The UE disables S1 mode and re-enables N1 mode, if it was disabled. The UE then registers with 5GC as described in clause 5.17.2.

When determining whether to redirect the UE, the AMF/MME takes into account the UE support of S1/N1 mode, respectively, and the UE's Preferred Network Behaviour and the Supported Network Behaviour of the network the UE is being redirected towards.

If after redirection the UE cannot find a cell supporting connectivity, the UE may re-enable the disabled N1/S1 mode and then perform Registration, Attach or TAU."

As can be seen, the prior art solution for redirection or steering of the UE depends only on rejecting specific NAS messages i.e. by sending a Registration Reject message in 5GS, and Attach Reject or TAU Reject message in EPS.

There are a few indications that the UE can send in 5GSM messages. For example, during PDU session establishment procedure, the UE sends the Maximum number of supported packet filters IE in the PDU SESSION ESTABLISHMENT REQUEST message if the UE supports more than 16 packet filters.

Similarly, the UE should indicate if it supports reflective quality of service (RQoS) during PDU session establishment as described below from the aforementioned NAS specification:

"The UE should set the RQoS bit to "Reflective QoS supported" in the 5GSM capability IE of the PDU SESSION ESTABLISHMENT REQUEST message if the UE supports reflective QoS and:

a) the UE requests to establish a new PDU session of "IPv4", "IPv6", "IPv4v6" or "Ethernet" PDU session type;
b) the UE requests to transfer an existing PDN connection in the EPS of "IPv4", "IPv6", "IPv4v6" or "Ethernet" PDN type or of "Non-IP" PDN type mapping to "Ethernet" PDU session type, to the 5GS; or
c) the UE requests to transfer an existing PDN connection in an untrusted non-3GPP access connected to the EPC of "IPv4", "IPv6" or "IPv4v6" PDN type to the 5GS."

Similarly, when the UE comes from EPS (i.e. from S1 mode) into 5GS (i.e. into N1 mode), if the UE has a PDN connection that was first established in S1 mode, the UE shall perform a PDU session modification procedure to report some of its capabilities such as: whether the UE supports more than 16 packet filters, or whether the UE supports RQoS. The following from the aforementioned NAS specification describes this:

"For a PDN connection established when in S1 mode, after the first inter-system change from S1 mode to N1 mode, if the UE is operating in single-registration mode in the network supporting N26 interface, the PDU session is of "IPv4", "IPv6", "IPv4v6", or "Ethernet" PDU session type, and:

a) the UE is performing the PDU session modification procedure to indicate the support of reflective QoS, the UE shall set the RQoS bit to "Reflective QoS supported" in the 5GSM capability IE of the PDU SESSION MODIFICATION REQUEST message; or
b) the UE is performing the PDU session modification procedure to indicate that reflective QoS is not supported, the UE shall set the RQoS bit to "Reflective QoS not supported" in the 5GSM capability IE of the PDU SESSION MODIFICATION REQUEST message.

For a PDN connection established when in S1 mode, after the first inter-system change from S1 mode to N1 mode, if the UE is operating in single-registration mode in the network supporting N26 interface, the PDU session is of "IPv4", "IPv6", "IPv4v6", or "Ethernet" PDU session type, and the UE supports more than 16 packet filters for this PDU session, the UE shall indicate the maximum number of packet filters supported for the PDU session in the Maximum number of supported packet filters IE of the PDU SESSION MODIFICATION REQUEST message."

The following is specified in the aforementioned NAS specification regarding interworking and the transfer of PDU sessions between N1 mode and S1 mode. During interworking, the UE has to handle specific parameters as defined by the following rules from the aforementioned NAS specification:

"Interworking with EPS is supported for a PDU session, if the PDU session includes the mapped EPS bearer context (s) or has association(s) between QoS flow and mapped EPS bearer after inter-system change from S1 mode to N1 mode. The SMF shall not include any mapped EPS bearer contexts associated with a PDU session for LADN and with a PDU session which is a multi-homed IPv6 PDU session. See coding of the Mapped EPS bearer contexts IE in subclause 9.11.4.8. In an MA PDU session, the UE shall have one set of the mapped EPS bearer contexts. The network can provide the set of the mapped EPS bearer contexts of the MA PDU session via either access of the MA PDU session. In an MA PDU session, the UE shall support modification or deletion via an access of a mapped EPS bearer context of the MA PDU session created via the same or the other access.

Upon inter-system change from N1 mode to S1 mode, the UE shall create the default EPS bearer context and the dedicated EPS bearer context(s) based on the parameters of the mapped EPS bearer contexts or the associations between QoS flow and mapped EPS bearer in the PDU session, if available. The EPS bearer identity assigned for the QoS flow of the default QoS rule becomes the EPS bearer identity of the default bearer in the corresponding PDN connection. If there is no EPS bearer identity assigned to the QoS flow of the default QoS rule of a PDU session associated with 3GPP access, the UE shall perform a local release of the PDU session. If there is no EPS bearer identity assigned to the QoS flow(s) of a PDU session associated with 3GPP access which is not associated with the default QoS rule, the UE shall locally delete the QoS rules and the QoS flow description(s). The UE uses the parameters from each PDU session for which interworking with EPS is supported to create corresponding default EPS bearer context and optionally dedicated EPS bearer context(s) as follows:

a) the PDU session type of the PDU session shall be mapped to the PDN type of the default EPS bearer context as follows:
   1) the PDN type shall be set to "non-IP" if the PDU session type is "Unstructured";
   2) the PDN type shall be set to "IPv4" if the PDU session type is "IPv4";
   3) the PDN type shall be set to "IPv6" if the PDU session type is "IPv6";
   4) the PDN type shall be set to "IPv4v6" if the PDU session type is "IPv4v6";
   5) the PDN type shall be set to "non-IP" if the PDU session type is "Ethernet", and the UE, the network or both of them do not support Ethernet PDN type in S1 mode; and
   6) the PDN type shall be set to "Ethernet" if the PDU session type is "Ethernet" and the UE and the network support Ethernet PDN type in S1 mode;
b) the PDU address of the PDU session shall be mapped to the PDN address of the default EPS bearer context as follows:
   1) the PDN address of the default EPS bearer context is set to the PDU address of the PDU session, if the PDU session type is "IPv4", "IPv6" or "IPv4v6"; and
   2) the PDN address of the default EPS bearer context is set to zero, if the PDU session type is "Ethernet" or "Unstructured";
c) the DNN of the PDU session shall be mapped to the APN of the default EPS bearer context;
d) the APN-AMBR and extended APN-AMBR received in the parameters of the default EPS bearer context of the mapped EPS bearer contexts shall be mapped to the APN-AMBR and extended APN-AMBR of the default EPS bearer context;
e) for each PDU session in state PDU SESSION ACTIVE, PDU SESSION MODIFICATION PENDING or PDU SESSION INACTIVE PENDING the UE shall set the state of the mapped EPS bearer context(s) to BEARER CONTEXT ACTIVE; and
f) for any other PDU session the UE shall set the state of the mapped EPS bearer context(s) to BEARER CONTEXT INACTIVE.

Additionally, for each mapped EPS bearer context or the association between QoS flow and mapped EPS bearer in the PDU session:

a) the EPS bearer identity shall be set to the EPS bearer identity received in the mapped EPS bearer context, or the EPS bearer identity associated with the QoS flow;
b) the EPS QoS parameters shall be set to the mapped EPS QoS parameters of the EPS bearer received in the mapped EPS bearer context, or the EPS QoS parameters associated with the QoS flow;
c) the extended EPS QoS parameters shall be set to the mapped extended EPS QoS parameters of the EPS bearer received in the mapped EPS bearer context, or the extended EPS QoS parameters associated with the QoS flow; and
d) the traffic flow template shall be set to the mapped traffic flow template of the EPS bearer received in the mapped EPS bearer context, or the stored traffic flow template associated with the QoS flow, if available.

After inter-system change from N1 mode to S1 mode, the UE shall associate the PDU session identity, the S-NSSAI, and the session-AMBR with the default EPS bearer context, and for each EPS bearer context mapped from one or more QoS flows, associate the QoS rule(s) for the QoS flow(s) and the QoS flow description(s) for the QoS flow(s) with the EPS bearer context.

After inter-system change from N1 mode to S1 mode, the UE and the SMF shall maintain the PDU session type of the PDU session until the PDN connection corresponding to the PDU session is released if the UE supports non-IP PDN type and the PDU session type is "Ethernet" or "Unstructured".

After inter-system change from N1 mode to S1 mode, the UE and the SMF shall maintain the following 5GSM attributions and capabilities associated with the PDU session until the PDN connection corresponding to the PDU session is released:

the always-on PDU session indication;
the maximum number of supported packet filters;
the support of reflective QoS;
the maximum data rate per UE for user-plane integrity protection supported by the UE for uplink and the maximum data rate per UE for user-plane integrity protection supported by the UE for downlink; and
the support of multi-homed IPv6 PDU session.

After inter-system change from N1 mode to S1 mode, the UE shall deem that the following features are supported by the network on the PDN connection corresponding to the PDU session:

PS data off; and
Local address in TFT.

If there is a QoS flow used for IMS signaling, after inter-system change from N1 mode to S1 mode, the EPS bearer associated with the QoS flow for IMS signaling becomes the EPS bearer for IMS signaling."

The text above describes that the UE, at inter-system change from N1 mode to S1 mode, will create mapped EPS bearer context for the default bearer and the dedicated bearer, specifically "the UE shall create the default EPS bearer context and the dedicated EPS bearer context(s) based on the parameters of the mapped EPS bearer contexts or the associations between QoS flow and mapped EPS bearer in the PDU session, if available".

For example, when the UE moves from N1 mode to S1 mode, then for "each PDU session in state PDU SESSION ACTIVE, PDU SESSION MODIFICATION PENDING or PDU SESSION INACTIVE PENDING the UE shall set the state of the mapped EPS bearer context(s) to BEARER CONTEXT ACTIVE", i.e. this means that the UE considers the EPS bearer context to be active and hence can be transferred.

And "after inter-system change from N1 mode to S1 mode, the UE shall associate the PDU session identity, the S-NSSAI, and the session-AMBR with the default EPS bearer context, and for each EPS bearer context mapped from one or more QoS flows, associate the QoS rule(s) for the QoS flow(s) and the QoS flow description(s) for the QoS flow(s) with the EPS bearer context." i.e. the QoS rule(s) and the QoS flow descriptions(s) are maintained and are associated with the EPS bearer context.

There are several issues in the prior art referred to above and it is an aim of embodiments of the present invention to address these.

Figure 3:
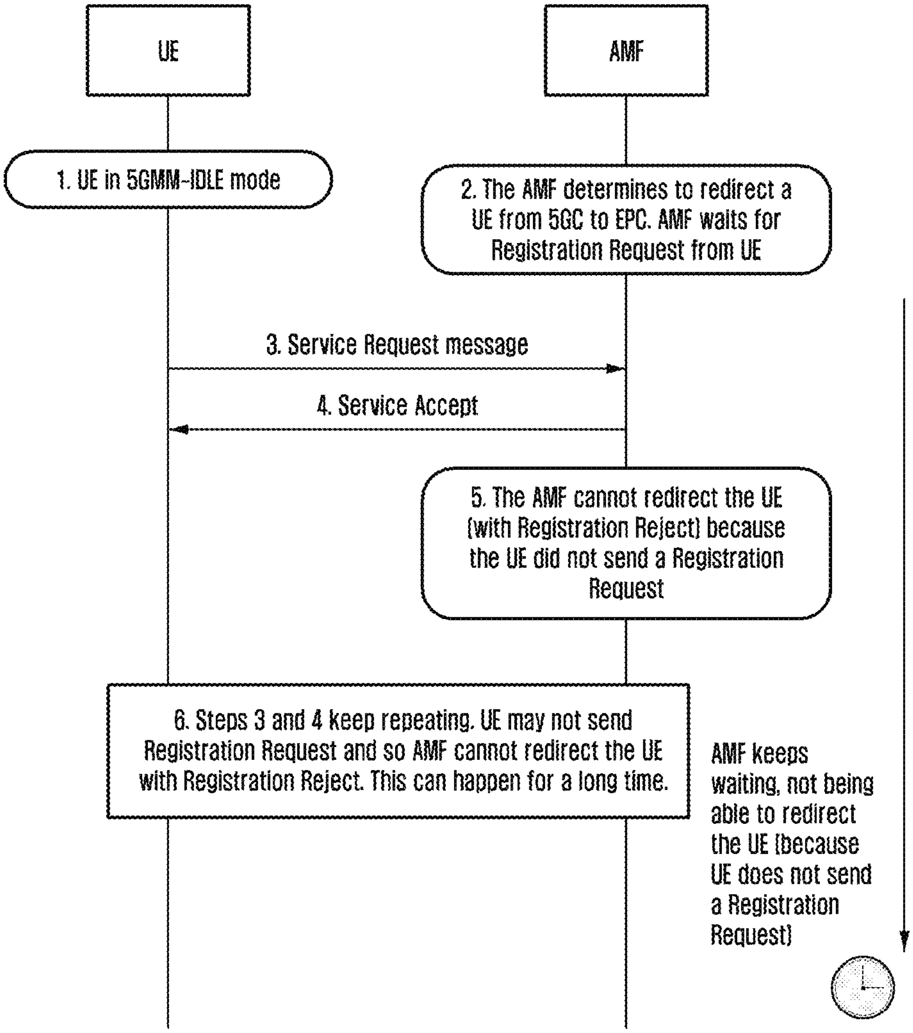
FIG. 3 Prior Art
FIGS. 3 to 5 show messaging formats illustrating various issues in the prior art.

In particular, as described earlier, the AMF can only redirect the UE during a registration procedure. This means that if the UE is already in connected mode or transitions to connected mode with the service request procedure, then the AMF will not be able to redirect the UE for a relatively long time. Similarly, the MME may not be able to redirect the UE that is in connected mode for a relatively long time if the UE continues to transition to connected mode with the service request procedure. This is illustrated, in particular, in FIG. 3 which shows the steps involved in the registration procedure and the issue whereby the AMF keeps waiting, not being able to redirect the UE, because the UE does not send a Registration Request.

Figure 4:
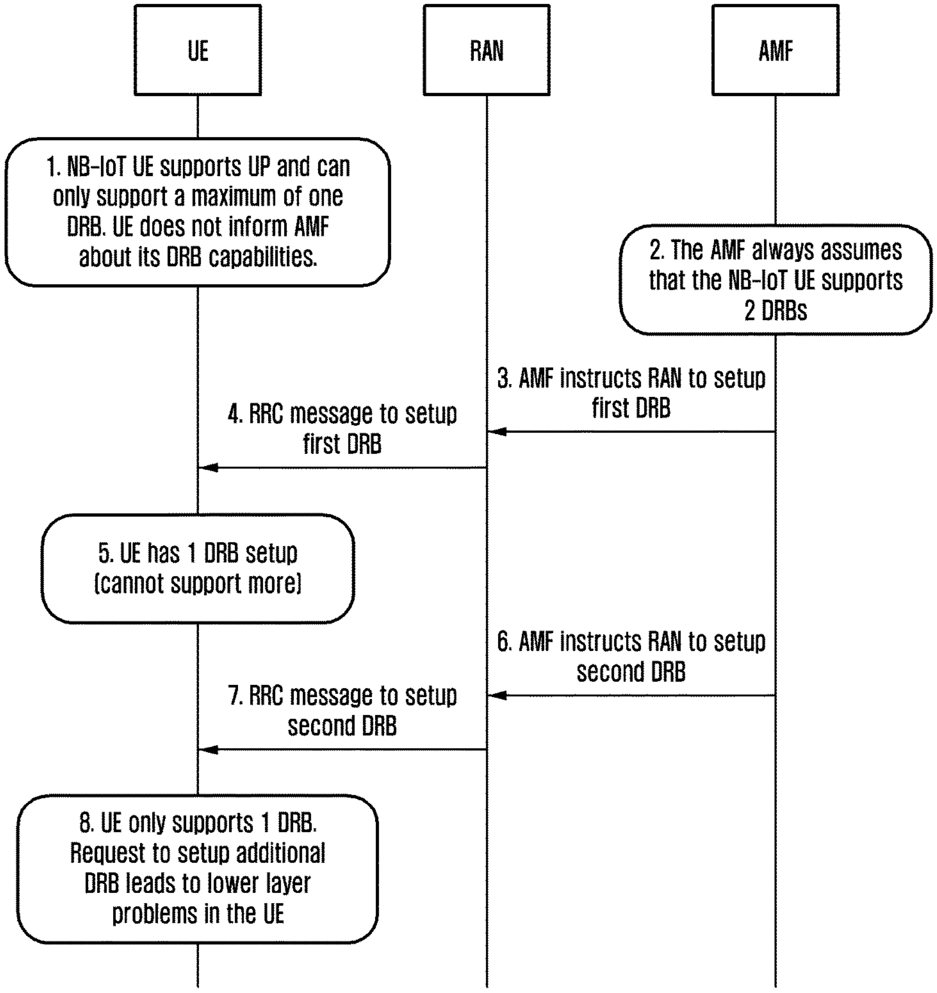
FIG. 4 Prior Art

Further, the UE in EPS indicates how many DRBs it can support which is dependent on the UE's NB-IoT capabilities. For 5G CIoT, the UE's RAT is the same but simply connected to the 5G CN. As such, it may be the case that the NB-IoT UE actually supports only 1 DRB and if so, the AMF does not know about it. In fact, the AMF, in the prior art, assumes that the NB-IoT UE always supports 2 DRBs. This can lead to system-wide issues and unexpected UE and network behaviour e.g. when the network tries to setup more than one DRB for a UE that supports only one DRB. This is illustrated in FIG. 4, which shows the signaling between UE, RAN and AMF respectively.

Still further, a UE that first establishes a PDN connection in EPS may then transfer the session to 5GS. The UE may support user plane but the connection may be a connection for control plane only. Accordingly, such connections do not use packet filters. In the prior art, when the UE moves from S1 mode into N1 mode for the first time and the UE has a PDN connection that was established in S1 mode, the UE is mandated to report how many packet filters it supports if the UE does support more than 16 packet filters. Alternatively, the UE should report whether it supports RQoS. However, since this is a control plane only connection, this information is useless for the network, as it will never be used for such a connection or session. Therefore, sending this information only consumes resources unnecessarily.

Figure 5:
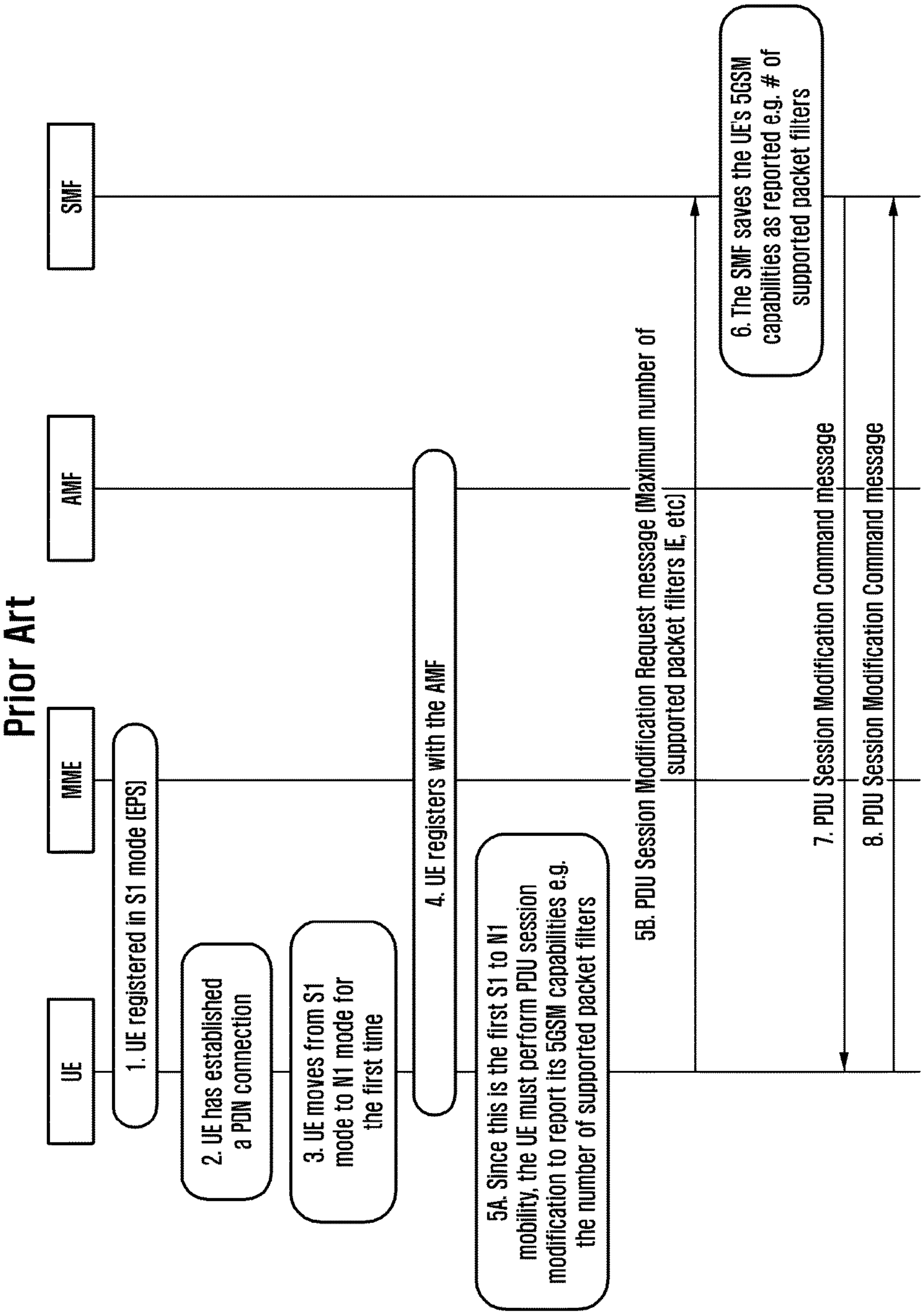
FIG. 5 Prior Art

FIG. 5 illustrates this issue and shows the signaling between the UE, MME, AMF and SMF respectively. It should be noted that step 5A/5B in FIG. 4 is always performed by the UE upon the first inter-system change from S1 mode to N1 mode if the UE does indeed support more than 16 packet filters. There was no other condition/exception that would have prevented the UE from taking this step.

The PDN connection that is established in S1 mode can be a connection for sending data over the control plane when the UE is using control plane (CP) CIoT optimization. Such a PDN connection may be only used for control plane data i.e. the user plane resources will never be set up for the PDN connection. In this case, the UE will receive the "control plane only indication" in the session management message. Therefore, for any PDN connection that is associated with the control plane only indication the UE can only send data over the control plane (i.e. over NAS) and the user plane will never be used. Hence packet filters will never be used for such a PDN connection. This will lead to extra signaling and an increase in power consumption especially for NB-IoT devices that can be power limited.

Embodiments of the present invention aim to address shortcomings in the prior art, whether mentioned herein or not.

According to the present invention there is provided an apparatus and method as set forth in the appended claims. Other features of the invention will be apparent from the dependent claims, and the description which follows.

According to a first aspect of the present invention, there is provided a method of redirecting a User Equipment, UE, from a serving network to a target network, whereby the serving network rejects a service request message.

In an embodiment, the serving network is a 5GC and the target network is an EPC whereby an AMF of the serving network sends a Service Reject message and includes 5GMM cause #31 "Redirection to EPC required".

In an embodiment, wherein when the UE, in N1 mode, receives a Service Reject with 5GMM cause #31, the UE takes the following actions:

a) the UE set the 5GS update status to 5U3 ROAMING NOT ALLOWED
b) The UE resets the service request attempt counter and enter the state 5GMM-REGISTERED.LIMITED-SERVICE
c) The UE enable E-UTRA capability if it was disabled and disables the N1 mode capability for 3GPP access
d) The UE, operating in single-registration mode, handles the EPS parameters, the EMM parameters, EMM state, and EPS update status
e) If 5GMM cause #31 is received by a UE that has not indicated support for CIoT optimizations, or received by a UE over non-3GPP access, or from a cell belonging to an Stand-alone Non-Public Network (SNPN), this is considered as an abnormal case
f) The UE discards the Service Reject message with cause #31 if the message is received without integrity protection In an embodiment, the serving network is an EPC and the target network is a 5GC whereby an MME of the serving network sends a Service Reject message and includes EMM cause #31 "Redirection to 5GCN required".

In an embodiment, when the UE in S1 mode receives a Service Reject with EMM cause #31, the UE takes the following actions:

a) The UE set the EPS update status to EU3 ROAMING NOT ALLOWED
b) The UE resets the service request attempt counter and enter the state EMM-REGISTERED.LIMITED-SERVICE
c) The UE enables N1 mode capability for 3GPP access if it was disabled and disable the E-UTRA capability
d) The UE, operating in single registration mode, handles the 5GMM parameters, 5GMM state, 5GS update status
e) If EMM cause #31 is received by a UE that has not indicated support for CIoT optimizations, this is considered as an abnormal case.

According to a second aspect of the present invention, there is provided a method of managing a PDN connection, wherein if the PDN connection is established in S1 mode, the UE verifies if an associated PDU session is associated with a Control Plane only indication.

In an embodiment, the PDN connection is established after a first inter-system change from S1 mode to N1 mode and the UE is operating in single-registration mode in a network supporting N26 interface and the PDU session is one of "IPv4", "IPv6", "IPv4v6", or "Ethernet" PDU session type, and the UE supports more than 16 packet filters for this PDU.

In an embodiment, if the UE determines that the PDU session is not associated with a control plane only indication, then the UE shall include the Maximum number of supported packet filters IE in a PDU SESSION MODIFICATION REQUEST message.

In an embodiment, wherein the PDU SESSION MODIFICATION REQUEST message is not sent if a reason to otherwise send the message is to indicate the number of packet filters that the UE supports.

In an embodiment, wherein the PDU SESSION MODIFICATION REQUEST message is not sent if a reason to otherwise send the message is to indicate that the UE supports RQoS.

According to a third aspect of the present invention, there is provided a method of managing a PDN connection in a UE, wherein after a system change from S1 mode to NB-N1 mode, if the UE determines that a PDU session modification procedure should performed for the purpose of indicating that the UE supports RQoS, the UE nevertheless, does not send PDU SESSION MODIFICATION REQUEST message In an embodiment, the method of the third aspect is performed regardless of a Control Plane only indication or not.

According to a fourth aspect of the present invention, there is provided a method of operating a UE in NB-N1 mode wherein the UE informs a serving network about a number of Data Radio Bearers (DRBs) that the UE is able to support, according to its capabilities.

In an embodiment, the UE informs by means of a bit in a message to the network wherein a first value of the bit means that the UE supports 1 DRB or that multiple DRBs are not supported, and a second value of the bit means that the UE supports more than one DRB, which may be a maximum of M DRBs, where M is an integer.

In an embodiment, the bit is bit 3, octet 5 of 5GMM Capability IE.

According to a fifth aspect of the present invention, there is provided a method of a UE requesting establishment of User Plane resources for a number of PDU sessions, wherein the number of PDU sessions is not greater than a maximum number of DRBs that the UE can support.

In an embodiment, when the UE requests Use Plane resources, the UE, by means of an Uplink data status IE does not indicate a total number of User Plane resources that is greater than a number of DRBs that the UE can support.

According to a sixth aspect of the present invention, there is provided a method, in a network, of establishing User Plane resources in response to a request from a UE, wherein the User Plane resources are established if the total number of User Plane resources does not exceed a maximum number of DRBs that are supported by the UE.

In an embodiment, an AMF in the network requests an SMF in the network to establish the User Plane resources.

In an embodiment, the AMF verifies if a new DRB can be established based on how many DRBs the UE can support.

According to a seventh aspect of the present invention, there is provided a method, in a network, of controlling establishing User Plane resources for a UE, wherein if a Payload container type IE is set to "N1 SM information", the Request type IE is set to "initial request", an AMF in the network verifies how many DRBs are already present for the UE and if the AMF determines that there are User Plane resources that are equal to a maximum number of DRBs that the UE supports, then the AMF either: (a) sends a message back to the UE; or (b) establishes the session as a control plane only session According to an eighth aspect of the present invention, there is provided apparatus arranged to perform any one of the previous aspects.

Although a few preferred embodiments of the present invention have been shown and described, it will be appreciated by those skilled in the art that various changes and modifications might be made without departing from the scope of the invention, as defined in the appended claims.

According to a first embodiment, when a current serving (core) network (EPC or 5GC, and hence MME or AMF respectively) determines to redirect a UE to a target system or (core) network (5GC or EPC), the current service network may take the following actions:

If the UE is in connected mode (i.e. EMM-CONNECTED mode for S1 mode, or 5GMM-CONNECTED mode for N1 mode)

If the UE is in N1 mode, the AMF sends the DEREGISTRATION REQUEST message to the UE and includes the 5GMM cause #31 "Redirection to EPC required"

If the UE is in S1 mode, the MME sends the DETACH REQUEST message to the UE and includes the EMM cause #31 "Redirection to 5GCN required"

If the UE is in idle mode (i.e. EMM-IDLE mode for S1 mode, or 5GMM-IDLE mode for N1 mode), and the UE transitions to connected mode (i.e. EMM-CONNECTED mode for S1 mode, or 5GMM-CONNECTED mode for N1 mode) with the Service Request message, Control Plane Service Request message, or Extended Service Request message (only applicable to S1 mode), and the core network (e.g. MME or AMF) determines to redirect the UE to a target core network (CN), then If the current CN node is an AMF (i.e. UE is in N1 mode), the AMF shall send the Service Reject message and include #31 "Redirection to EPC required"

If the current CN node is an MME (i.e. UE is in S1 mode), the MME shall send the Service Reject message and include #31 "Redirection to 5GCN required"

If the UE is in N1 mode and receives the Deregistration Request message with 5GMM cause #31 "Redirection to EPC required":

If 5GMM cause #31 is received by a UE that has not indicated support for CIoT optimizations or received by a UE over non-3GPP access is considered as an abnormal case and the behaviour of the UE is specified in subclause 5.5.1.2.7 of TS 24.501

If the 5GMM cause #31 cause value is received from a cell belonging to an SNPN is considered as an abnormal case and the behaviour of the UE is specified in subclause 5.5.1.2.7.

The UE shall set the 5GS update status to 5U3 ROAMING NOT ALLOWED (and shall store it according to subclause 5.1.3.2.2) and shall delete any 5G-GUTI, last visited registered TAI, TAI list and ngKSI. Additionally, the UE shall reset the registration attempt counter and enter the state 5GMM-DEREGISTERED.

The UE shall enable the E-UTRA capability if it was disabled and disable the N1 mode capability for 3GPP access (see subclause 4.9.2 of TS 24.501).

If the message was received via 3GPP access and the UE is operating in single-registration mode, the UE shall handle the EMM parameters EMM state, EPS update status, 4G-GUTI, TAI list, eKSI and attach attempt counter as specified in 3GPP TS 24.301 [15] for the case when the EPS attach procedure is rejected with the EMM cause with the same value.

If the UE is in N1 mode and receives the Service Reject message with 5GMM cause #31 "Redirection to EPC required", the UE shall take the same actions as set out above (for receiving Deregistration Request in N1 mode). Optionally in addition to some of the actions set out above, the UE shall set the 5GS update status to 5U3 ROAMING NOT ALLOWED (and shall store it according to subclause 5.1.3.2.2). The UE shall reset the service request attempt counter and enter the state 5GMM-REGISTERED.LIMITED-SERVICE. The UE may enter this state instead of 5GMM-DEREGISTERED.

For a UE in N1 mode, if the Deregistration Request message with 5GMM cause #31, or the SERVICE REJECT message with 5GMM cause #31 is received without integrity protection, then the UE shall discard the message.

If the UE is in S1 mode and receives the Detach Request message with EMM cause #31 "Redirection to 5GCN required":

If the EMM cause #31 received by a UE that has not indicated support for CIoT optimizations is considered as an abnormal case and the behaviour of the UE is specified in subclause 5.5.1.2.6.

The UE shall set the EPS update status to EU3 ROAMING NOT ALLOWED (and shall store it according to subclause 5.1.3.3) and shall delete any GUTI, last visited registered TAI, TAI list and eKSI. Additionally, the UE shall reset the attach attempt counter and enter the state EMM-DEREGISTERED.

The UE shall enable N1 mode capability for 3GPP access if it was disabled and disable the E-UTRA capability (see subclause 4.5 of TS 24.301).

If the UE is operating in single-registration mode, the UE shall in addition handle the 5GMM parameters 5GMM state, 5GS update status, 5G-GUTI, last visited registered TAI, TAI list and ngKSI as specified in 3GPP TS 24.501 for the case when the initial registration procedure performed over 3GPP access is rejected with the 5GMM cause with the same value If the UE is in S1 mode and receives the Service Reject message with EMM cause #31 "Redirection to 5GCN required", the UE shall take the same actions as set out above (for receiving Detach Request in S1 mode). Optionally in addition to some of the actions set out above, the UE shall set the 5GS update status to EU3 ROAMING NOT ALLOWED (and shall store it according to subclause 5.1.3.2.2). The UE shall reset the service request attempt counter and enter the state EMM-REGISTERED.LIMITED-SERVICE. The UE may enter this state instead of EMM-DEREGISTERED.

For a UE in S1 mode, if the DETACH REQUEST message or SERVICE REJECT message with EMM cause #31 is received without integrity protection, then the UE shall discard the message.

The UE in NB-N1 mode (i.e. in 5GS) should inform the network (e.g. AMF) about the number of data radio bearers (DRBs) that the UE can support based on its capabilities. To do so the UE can send a new indication to the AMF in any 5GMM NAS message. This indication may be implemented in a new IE or an existing IE, known in the prior art.

Furthermore, the indication may be in the form of a number i.e. to indicate that the UE supports X DRBs, where X is an integer and where the indication enables the UE to signal X.

Alternatively, a new bit can be defined (in a new or existing IE), where the new bit can have one of two values as follows:

If the bit is set to zero, then this means that the UE supports 1 DRB or it means that multiple DRB is not supported. Alternatively, if the bit is set to one (i.e. 1), then this means that the UE supports more than one DRB, and this may be a maximum of M, where M is an integer. For example, M can be the integer 2, hence by setting the bit to '1', the UE indicates that it supports 2 DRBs. Or this value (i.e. 1) can be interpreted to mean "Multiple DRB supported".

For example, a new bit can be used in the 5GMM capability IE bit. For example, bit 3 of octet 5 of this prior art IE can be defined to mean be the Multiple DRB support bit ('multipleDRB' bit). This is shown in the table in FIG. 2

Note that the 5GMM capability IE is used as an example, but another IE may be used instead.

As such, the UE should indicate its capability for the multipleDRB bit by setting the appropriate value in the bit when sending the Registration Request. If the UE supports N3 data transfer (i.e. user plane data transfer) and multiple user plane (data) radio bearers, then the UE shall set the Multiple DRB support bit to "Multiple DRB supported" in the 5GMM capability IE of the REGISTRATION REQUEST message.

In the prior art, the AMF verifies if the UE has user plane resources established for a certain number of PDU sessions, where this number is currently 2. However, this is incorrect since the UE may actually support 1 DRB. Therefore, the UE cannot have user plane resources established for more than the maximum number of DRBs that the UE can support, where this maximum number can be an integer M. For example, the UE in NB-N1 mode can at most support 1 DRB or 2 DRBs.

The UE shall not use the service request procedure to request the establishment of user plane resources for a number of PDU sessions that is greater than the maximum number of DRBs that the UE can support. Hence, if the UE sends a Service Request (SR) message or the Control Plane Service Request (CPSR) message, the UE shall ensure that:

The Uplink data status IE shall not be set such that user plane resources are requested for a number of PDU sessions that is bigger or larger than the maximum number of DRBs that the UE supports. Hence, the total number of PDU sessions for which user plane resources are requested shall not exceed the total number of DRBs that the UE supports The Allowed PDU session status IE shall not be set such that user plane resources are requested for a number of PDU sessions that is bigger or larger than the maximum number of DRBs that the UE supports. Hence, the total number of PDU sessions for which user plane resources are requested (to be transferred to 3GPP access) shall not exceed the total number of DRBs that the UE supports The Uplink data status IE and the Allowed data status IE shall both not be used and set such that user plane resources are requested (in both IEs) for a number of PDU sessions that is bigger or larger than the maximum number of DRBs that the UE supports. Hence, the total number of PDU sessions for which user plane resources are requested (in both IEs) shall not exceed the total number of DRBs that the UE supports As such, when the AMF receives a SR message, or CPSR message that contains:

The Uplink data status IE, the AMF shall verify if the number of PDU sessions for which UP resources will be established based on the IE (and possibly based on any PDU session that already has UP established for the UE) is bigger than the maximum number of DRBs that the UE supports based on the indication from the UE as proposed earlier. If yes, then the AMF shall:

Either not request the SMF to establish UP resources for the UE; or shall choose to request the SMF(s) to establish UP resources for the UE such that the total number of PDU sessions for which UP resources will be established does not exceed the maximum number of DRBs that the UE supports based on the indication from the UE as set out earlier The Allowed data status IE, the AMF shall verify if the number of PDU sessions for which UP resources to be established based on the IE (and possibly based on any PDU session that already has UP established for the UE) is bigger than the maximum number of DRBs that the UE supports based on the indication from the UE as proposed earlier. If yes, then the AMF shall:

Either not request the SMF to establish UP resources for the UE; or shall choose to request the SMF(s) to establish UP resources for the UE such that the total number of PDU sessions for which UP resources will be established does not exceed the maximum number of DRBs that the UE supports based on the indication from the UE as set out earlier For a UE in NB-N1 mode, if the Uplink data status IE (or Allowed PDU session status IE) is included in the SR message or CPSR message, and does not indicate a request to have user-plane resources established for a number of PDU sessions that is bigger/larger/more than the maximum number of DRBs that the UE can support (as has been set out earlier i.e. based on the UE's indication in the 5GMM capability IE), then the AMF shall indicate to the SMF to re-establish the user-plane resources for the corresponding PDU sessions.

For a UE in NB-N1 mode, if the Uplink data status IE (or Allowed PDU session status IE) is included in the SR message or CPSR message, and indicates a request to have user-plane resources established for a number of PDU sessions that is bigger/larger/more than the maximum number of DRBs that the UE can support (as has been set out earlier i.e. based on the UE's indication in the 5GMM capability IE), then the AMF shall not indicate to the SMF to re-establish the user-plane resources for the corresponding PDU sessions.

For a UE in NB-N1 mode, if the Uplink data status IE and the Allowed PDU session status IE are included in the SR message or CPSR message, and indicate a request to have user-plane resources established for a number of PDU sessions that is bigger/larger/more than the maximum number of DRBs that the UE can support (as has been set out earlier i.e. based on the UE's indication in the 5GMM capability IE), then the AMF shall not indicate to the SMF to re-establish the user-plane resources for the corresponding PDU sessions.

An AMF should take the following actions when the UE requests to establish a PDU session and the UE is in NB-N1 mode and is using user plane CIoT 5GS optimization.

Upon reception of a UL NAS TRANSPORT message, if the Payload container type IE is set to "N1 SM information", the Request type IE is set to "initial request", and a) the UE is in NB-N1 mode;
b) the UE has indicated preference for user plane CIoT 5GS optimization;
c) the network accepted the use of user plane CIoT 5GS optimization; and
d) the AMF determines that there are user-plane resources established for a total number of PDU sessions for this UE and this number is equal to the maximum number of DRBs that the UE supports (or has indicated that is supports as proposed earlier);

the AMF shall either:

a) send back to the UE the 5GSM message in a DL NAS TRANSPORT message and include the 5GMM cause 5GMM cause #92 "insufficient user-plane resources for the PDU session". Note that another existing 5GMM cause can also be used; or
b) proceed with the PDU session establishment and include the Control Plane CIoT 5GS Optimisation indication or Control Plane Only indicator to the SMF.

Note that the procedure set out above applies if the Request type is set to "existing PDU session".

Based on the above, the AMF shall not assume that the UE always supports 2 DRBs and so it cannot assume that if the UE has UP resources established for 1 PDU session, then the network can establish UP resources for another new session. If the UE supports only 1 DRB, then the AMF shall either reject a new request for a PDU session (by sending the 5GSM message in a DL NAS TRANSPORT message and include the 5GMM cause 5GMM cause #92 "insufficient user-plane resources for the PDU session"), or proceed with the PDU session establishment and include the Control Plane CIoT 5GS Optimisation indication or Control Plane Only indicator to the SMF.

Therefore, the determination to setup a new PDU session with user plane resources for a UE in NB-N1 mode should be based on what the UE supports in terms of number of DRBs. Hence, the AMF should verify if the UE has UP resources established for a total number of PDU sessions and whether this total number is the same as the maximum number of DRBs that the UE supports:

If the UE currently has UP resources established for a number of PDU sessions and this number is less than the maximum number of DRBs that the UE can support (as has been set out earlier i.e. based on the UE's indication in the 5GMM capability IE), then the AMF can accept the request from the UE to establish a PDU session and establish the corresponding UP resources

- If the UE currently has UP resources established for a number of PDU sessions and this number is equal to the maximum number of DRBs that the UE can support (as has been set out earlier i.e. based on the UE's indication in the 5GMM capability IE), then the AMF shall either reject the request (by sending the 5GSM message in a DL NAS TRANSPORT message and include the 5GMM cause 5GMM cause #92 "insufficient user-plane resources for the PDU session"), or proceed with the PDU session establishment and include the Control Plane CIoT 5GS Optimisation indication or Control Plane Only indicator to the SMF.

When the UE has a PDN connection that is first established in S1 mode, and the UE performs the first inter-system change from S1 mode to N1 mode, if the PDN connection was established as a Control plane only connection (i.e. the UE received the Control plane only indication IE in the in the ACTIVATE DEFAULT EPS BEARER CONTEXT REQUEST message), the UE shall not send the Maximum number of supported packet filters IE of the PDU SESSION MODIFICATION REQUEST message even if the UE supports more than 16 packet filters for this PDU session. If the PDU session modification procedure (e.g. after the first inter-system change from S1 mode to N1 mode and optionally the UE is operating in single registration mode, and optionally the network supports the N26 interface) is to be performed (optionally solely) for the purpose of indicating the number of packet filters that the UE supports (optionally where/when this number is more than 16), then the UE should not perform the PDU session modification procedure, optionally where not performing the PDU session modification procedure implies that the UE does not send the PDU Session Modification Request message. However, if the UE determines to perform the PDU session modification procedure (e.g. the UE determines to send the PDU Session Modification Request message) for other reasons than indicating the number of packet filters that the UE supports, then the UE should not include the Maximum number of supported packet filters IE in the PDU SESSION MODIFICATION REQUEST message if the UE PDU session is determined to be associated with a control plane only indication (even when the UE indeed can support more than 16 packet filters). Otherwise, if the PDU session is not associated with a control plane only indication and the UE does support more than 16 packet filters, then the UE can include the Maximum number of supported packet filters IE in the PDU SESSION MODIFICATION REQUEST message if the UE determines that the message is to be sent.

In general, the UE should determine whether a transferred session is a control plane only session or not, and:

- If the UE determines that the session is a control plane only session, and if the UE supports more than 16 packet filters, then the UE shall not send the Maximum number of supported packet filters IE of the PDU SESSION MODIFICATION REQUEST message. However, if the message is to be sent for (optionally solely for) the purpose of indicating the number of packet filters that the UE supports (optionally where/when this number is more than 16), then the UE should not perform the PDU session modification procedure, optionally where not performing the PDU session modification procedure implies that the UE does not send the PDU Session Modification Request message
- If the UE determines that the session is not a control plane only session, and if the UE supports more than 16 packet filters, then the UE shall not send the Maximum number of supported packet filters IE of the PDU SESSION MODIFICATION REQUEST message For a PDN connection established when in S1 mode, after the first inter-system change from S1 mode to N1 mode, if the UE is operating in single-registration mode in the network supporting N26 interface, the PDU session is of "IPv4", "IPv6", "IPv4v6", or "Ethernet" PDU session type, and the UE supports more than 16 packet filters for this PDU session:

- If the PDU session is not a control plane only session, the UE shall indicate the maximum number of packet filters supported for the PDU session in the Maximum number of supported packet filters IE of the PDU SESSION MODIFICATION REQUEST message;
- Otherwise (i.e. if the PDU session is a control plane only session) the UE shall not indicate the maximum number of packet filters supported for the PDU session in the Maximum number of supported packet filters IE of the PDU SESSION MODIFICATION REQUEST message The above can also apply in the general case for an inter-system change from S1 mode to NB-N1 mode when user plane CIoT optimization is being used since only one default QoS rule is supported per PDU session in NB-N1 mode. As such, when the UE moves from NB-N1 mode to WB-N1 mode, the UE can then send the PDU Session Modification Request message to indicate that it supports more than 16 packet filters (if this is the case) by including the Maximum number of supported packet filters IE of the PDU SESSION MODIFICATION REQUEST message.

Another option is that the UE, after an inter-system change from S1 mode to NB-N1 mode, should not indicate that is supports RQoS.

For example, if for any of the following combination of conditions (e.g. that should be verified by the UE):

after an inter-system change from S1 mode to NB-N1 mode, the UE is operating in single registration mode, the network supports N26 interface, and the UE supports RQoS.

Then if the UE determines that a PDU session modification procedure needs to be performed for (optionally solely for) the purpose of indicating that the UE supports RQoS, then the UE should not perform the PDU session modification procedure i.e. the UE should not send the PDU Session Modification Request message.

If the UE determines to perform the PDU session modification procedure (i.e. the UE determines to send the PDU Session Modification Request message e.g. due to other reasons), then the UE may indicate that it does not support RQoS (or the UE may not indicate that it supports RQoS) even if the UE actually supports RQoS.

However, after an inter-system change from NB-N1 mode to WB-N1 mode, the UE should send a PDU Session Modification Request message to indicate if (whether) it supports RQoS.

Note that the above also applies to any inter-system change from S1 mode to N1 mode for a PDU session for which the UE determines that the session is associated with a control plane only session. As such, for any such PDU session, the UE need not indicate that it supports RQoS as it simply will not be applies for control plane only PDU sessions. As such, if the UE determines that a PDU session modification procedure is required for the purpose of indicating the support of RQoS (e.g. under the conditions listed above), then the UE may further determine to not perform the PDU session modification procedure if the PDU session is associated with a control plane only indication, or for any other case in which the UE performs an inter-system change from S1 mode to N1 mode (optionally if the UE is operating in single registration mode, and/or the network supports N26 interface). The above may also apply for other new conditions such as, but not limited to, the type of PDU session e.g. unstructured PDU session, or any other new PDU session may be defined in the future for which such capabilities (or any other capabilities) would not apply. As such, for any capability that does not apply under certain conditions, the UE may determine to not perform the necessary 5GSM procedure when the procedure is to be performed for the purpose of indicating the capability in question. On the other hand, if the UE sends the 5GSM message then it may not indicate the capability in question if the capability would not apply in the mode in which the UE is currently operating in. As such, the UE may send the 5GSM message when it changes its mode of operation (e.g. enters a new mode or performs an inter-system change to a new mode) where the capability would then apply in the new mode.

Figure 6:
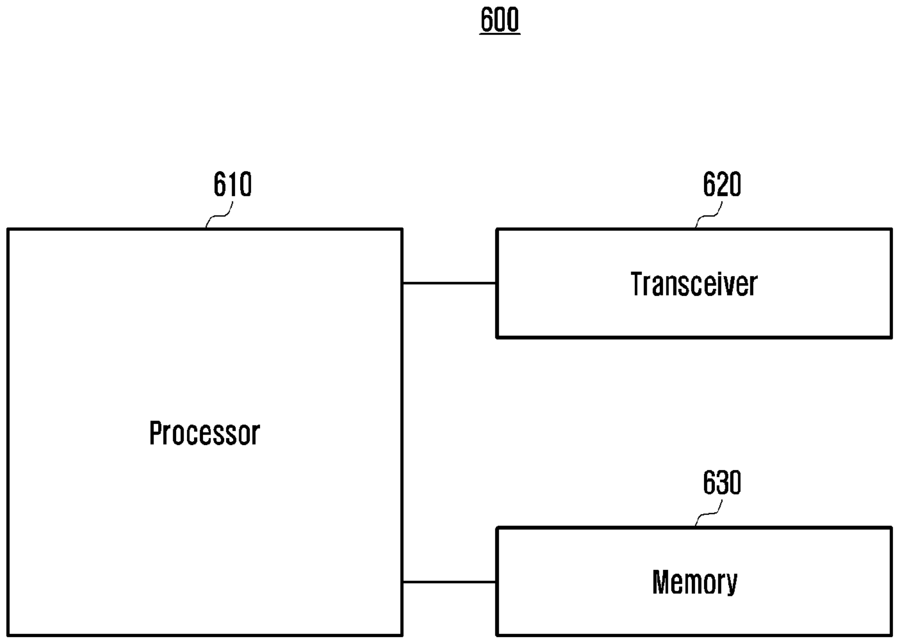
FIG. 6 illustrates a block diagram of an entity according to embodiments of the present disclosure.

FIG. 6 illustrates a block diagram of an entity according to embodiments of the present disclosure.

Referring to the FIG. 6, the entity 600 may include a processor 610, a transceiver 620 and a memory 630. However, all of the illustrated components are not essential. The entity 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the entity 600 may be implemented by the processor 610.

In one embodiment, the processor 610 may map PRS to Resource Elements (REs) of a frame structure and transmit the frame structure such that the power used to transmit REs containing PRS is higher than the power used to transmit REs not containing PRS.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 600 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the entity 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

Figure 7:
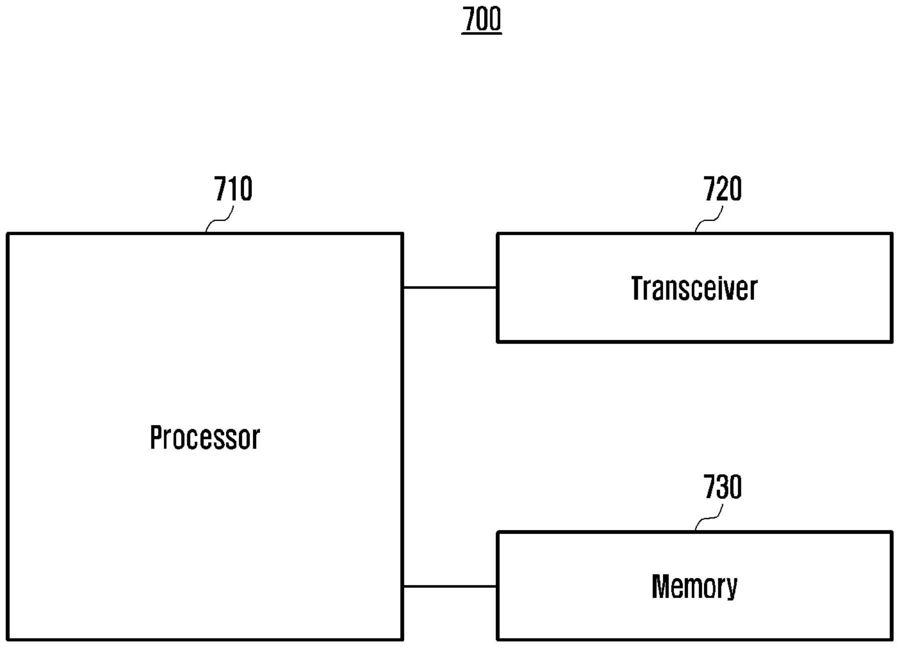
FIGS. 7 and 8 illustrate a user equipment (UE) and a method performed by the UE according to embodiments of the present disclosure.
Figure 8:
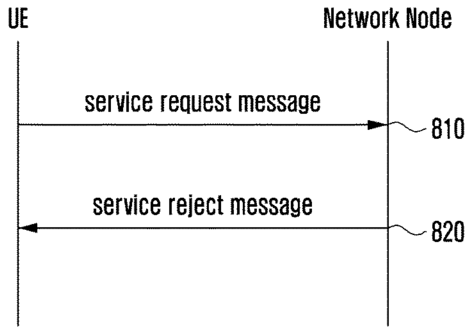

FIG. 7 illustrates a user equipment (UE) according to embodiments of the present disclosure and FIG. 8 illustrates an example method performed by a UE in a wireless communication system according to embodiments of the present disclosure.

Referring to the FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment. Referring to the FIG. 8, the UE, in step 810, transmits a service request message to a network node. In step 820, the UE receives, from the network node, a service reject message in response to transmitting the service request message.

The aforementioned components will now be described in detail.

The processor 710 may include one or more processors or other processing devices that control the proposed function, process, and/or method. Operation of the UE 700 may be implemented by the processor 710.

In one embodiment, the processor 710 may measure the signal strength from one or more base stations and transmit PRS with a power determined based on the measurements.

In one embodiment, the processor 710 may receive signaling from a base station and transmit PRS with a power determined based on the signaling.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE), in a communication system, the method comprising:

transmitting a service request message;

in case that the service request message is transmitted to an access and mobility management function (AMF):

receiving, from the AMF, a first service reject message including a fifth generation (5G) mobility management (5GMM) cause value of #31, and identifying that redirection to an evolved packet core (EPC) is required based on the 5GMM cause value; and in case that the service request message is transmitted to a mobility management entity (MME):

receiving, from the MME, a second service reject message including an EPC mobility management (EMM) cause value of #31, and identifying that redirection to a 5G core network (5GCN) is required based on the EMM cause value.

2. The method of claim 1, further comprising:

setting, based on the 5GMM cause value, 5G system update status to a 5U3 roaming not allowed.

3. The method of claim 2, further comprising, based on the 5GMM cause value:

resetting a service request attempt counter; and entering a state of 5GMM-REGISTERED LIMITED-SERVICE.

4. The method of claim 1, further comprising:
discarding the first service reject message in case that the first service reject message including the 5GMM cause value is received without integrity protection.

5. The method of claim 1, wherein the 5GMM cause value is considered as an abnormal case in case that:
the 5GMM cause value is received by the UE that has not indicated support for cellular internet of things (CIoT) optimizations;
the 5GMM cause value is received by the UE over non-3rd generation partnership project (3GPP) access; or
the 5GMM cause value is received from a cell belonging to a stand-alone non-public network (SNPN).

6. The method of claim 1, further comprising, based on the 5GMM cause value:
enabling evolved universal terrestrial radio access (E-UTRA) capability in case that the E-UTRA capability is disabled; and
disabling N1 mode capability for 3GPP access.

7. A method performed by a network node, in a communication system, the method comprising:
receiving, from a user equipment (UE), a service request message;
in case that the network node receiving the service request message corresponds to an access and mobility management function (AMF):
identifying that redirection to an evolved packet core (EPC) is required for the UE, and
transmitting, to the UE, a first service reject message including a fifth generation (5G) mobility management (5GMM) cause value of #31, wherein the 5GMM cause value indicates that the redirection to EPC is required; and
in case that the network node receiving the service request message corresponds to a mobility management entity (MME):
identifying that redirection to a 5G core network (5GCN) is required for the UE, and
transmitting, to the UE, a second service reject message including an EPC mobility management (EMM) cause value of #31, wherein the EMM cause value indicates that the redirection to 5GCN is required.

8. The method of claim 7, wherein, in case that the first service reject message including the 5GMM cause value is transmitted to the UE without integrity protection, the first service reject message is discarded.

9. The method of claim 7, wherein the 5GMM cause value is considered as an abnormal case in case that:
the 5GMM cause value is transmitted to the UE that has not indicated support for cellular internet of things (CIoT) optimizations;
the 5GMM cause value is transmitted to the UE over non-3rd generation partnership project (3GPP) access; or
the 5GMM cause value is transmitted by a cell belonging to a stand-alone non-public network (SNPN).

10. A user equipment (UE) in a communication system, the UE comprising:
a transceiver; and
a processor coupled with the transceiver and configured to:
transmit a service request message;
in case that the service request message is transmitted to an access and mobility management function (AMF):
receive, from the AMF, a first service reject message including a fifth generation (5G) mobility management (5GMM) cause value of #31, and
identify that redirection to an evolved packet core (EPC) is required based on the 5GMM cause value; and
in case that the service request message is transmitted to a mobility management entity (MME):
receive, from the MME, a second service reject message including an EPC mobility management (EMM) cause value of #31, and
identify that redirection to a 5G core network (5GCN) is required based on the EMM cause value.

11. The UE of claim 10, wherein the processor is further configured to, based on the 5GMM cause value:
set a 5G system update status to a 5U3 roaming not allowed,
reset a service request attempt counter, and
enter a state of 5GMM-REGISTERED LIMITED-SERVICE.

12. The UE of claim 10, wherein the processor is further configured to discard the first service reject message in case that the first service reject message including the 5GMM cause value is received without integrity protection.

13. The UE of claim 10,
wherein the processor is further configured to, based on the 5GMM cause value:
enable evolved universal terrestrial radio access (E-UTRA) capability in case that the E-UTRA capability is disabled, and
disable N1 mode capability for 3rd generation partnership project (3GPP) access, and
wherein the 5GMM cause value is considered as an abnormal case in case that:
the 5GMM cause value is received by the UE that has not indicated support for cellular internet of things (CIoT) optimizations,
the 5GMM cause value is received by the UE over non-3GPP access, or
the 5GMM cause value is received from a cell belonging to a stand-alone non-public network (SNPN).

14. A network node in a communication system, the network node comprising:
a transceiver; and
a processor coupled with the transceiver and configured to:
receive, from a user equipment (UE), a service request message;
in case that the network node receiving the service request message corresponds to an access and mobility management function (AMF):
identify that redirection to an evolved packet core (EPC) is required for the UE, and
transmit, to the UE, a first service reject message including a fifth generation (5G) mobility management (5GMM) cause value of #31, wherein the 5GMM cause value indicates that the redirection to EPC is required; and
in case that the network node receiving the service request message corresponds to a mobility management entity (MME):
identify that redirection to a 5G core network (5GCN) is required for the UE; and
transmit, to the UE, a second service reject message including an EPC mobility management (EMM)

cause value of #31, wherein the EMM cause value indicates that the redirection to 5GCN is required.

15. The network node of claim 14, wherein, in case that the first service reject message including the 5GMM cause value is transmitted the UE without integrity protection, the first service reject message is discarded, and wherein the 5GMM cause value is considered as an abnormal case in case that:

the 5GMM cause value is transmitted to the UE that has not indicated support for cellular internet of things (CIoT) optimizations;

the 5GMM cause value is transmitted to the UE over non-3$^{rd}$ generation partnership project (3GPP) access; or the 5GMM cause value is transmitted by a cell belonging to a stand-alone non-public network (SNPN).

* * * * *